(12) United States Patent
Chen et al.

(10) Patent No.: US 11,594,244 B2
(45) Date of Patent: Feb. 28, 2023

(54) APPARATUS AND METHOD FOR VOICE EVENT DETECTION

(71) Applicant: British Cayman Islands Intelligo Technology Inc., Grand Cayman (KY)

(72) Inventors: Tsan-Jieh Chen, Zhubei (TW);
Hong-Ching Chen, Zhubei (TW);
Chien Hua Hsu, Zhubei (TW);
Tsung-Liang Chen, Zhubei (TW)

(73) Assignee: BRITISH CAYMAN ISLANDS INTELLIGO TECHNOLOGY INC., Grand Cayman (KY)

( * ) Notice: Subject to any disclaimer, the term of this patent is extended or adjusted under 35 U.S.C. 154(b) by 402 days.

(21) Appl. No.: 16/871,587

(22) Filed: May 11, 2020

(65) Prior Publication Data

US 2021/0118467 A1   Apr. 22, 2021

Related U.S. Application Data

(60) Provisional application No. 62/924,648, filed on Oct. 22, 2019.

(51) Int. Cl.
*G10L 25/78* (2013.01)
*G10L 15/06* (2013.01)
(Continued)

(52) U.S. Cl.
CPC .............. *G10L 25/78* (2013.01); *G06N 3/08* (2013.01); *G06N 20/10* (2019.01); *G10L 15/02* (2013.01); *G10L 15/063* (2013.01); *G10L 15/16* (2013.01); *G10L 25/84* (2013.01); *G10L 25/87* (2013.01); *G10L 2015/025* (2013.01); *G10L 2025/783* (2013.01); *G10L 2025/786* (2013.01)

(58) Field of Classification Search
CPC ......... G10L 25/78; G10L 25/87; G10L 25/84; G10L 25/81; G10L 2025/783; G10L 2025/786

See application file for complete search history.

(56) References Cited

U.S. PATENT DOCUMENTS 6,249,757 B1 * 6/2001 Cason ..................... G10L 25/78
704/214
6,373,264 B1   4/2002 Matsumoto et al.
(Continued)

FOREIGN PATENT DOCUMENTS

CN   204857179 U   12/2015
TW      526327 B    4/2003
(Continued)

*Primary Examiner* — Samuel G Neway
(74) *Attorney, Agent, or Firm* — Muncy, Geissler, Olds & Lowe, P.C.

(57) ABSTRACT

A voice event detection apparatus is disclosed. The apparatus comprises a vibration to digital converter and a computing unit. The vibration to digital converter is configured to convert an input audio signal into vibration data. The computing unit is configured to trigger a downstream module according to a sum of vibration counts of the vibration data for a number X of frames. In an embodiment, the voice event detection apparatus is capable of correctly distinguishing a wake phoneme from the input vibration data so as to trigger a downstream module of a computing system. Thus, the power consumption of the computing system is saved.

27 Claims, 12 Drawing Sheets

(51) Int. Cl.
*G10L 15/16* (2006.01)
*G06N 3/08* (2006.01)
*G06N 20/10* (2019.01)
*G10L 15/02* (2006.01)
*G10L 25/87* (2013.01)
*G10L 25/84* (2013.01)

(56) References Cited

U.S. PATENT DOCUMENTS

| | | |
|---|---|---|
| 10,230,346 B2 | 3/2019 | Jing |
| 11,341,988 B1* | 5/2022 | Pishehvar .............. G10L 25/30 |
| 2001/0034601 A1* | 10/2001 | Chujo .................... G10L 25/78 |
| | | 704/E11.003 |
| 2011/0149108 A1* | 6/2011 | Takizawa ............... H04N 5/232 |
| | | 348/222.1 |
| 2011/0208520 A1* | 8/2011 | Lee ........................ G10L 25/78 |
| | | 704/E15.039 |
| 2012/0130713 A1* | 5/2012 | Shin ....................... G10L 25/78 |
| | | 704/E15.001 |
| 2012/0209601 A1* | 8/2012 | Jing ................... G10L 21/0364 |
| | | 704/226 |
| 2014/0188467 A1 | 7/2014 | Jing et al. |
| 2019/0005953 A1* | 1/2019 | Bundalo ............... G06F 1/3287 |
| 2021/0118467 A1* | 4/2021 | Chen ...................... G10L 15/16 |

FOREIGN PATENT DOCUMENTS

| | | |
|---|---|---|
| TW | 526467 B | 4/2003 |
| WO | WO-2001035389 A1 | 5/2001 |

* cited by examiner

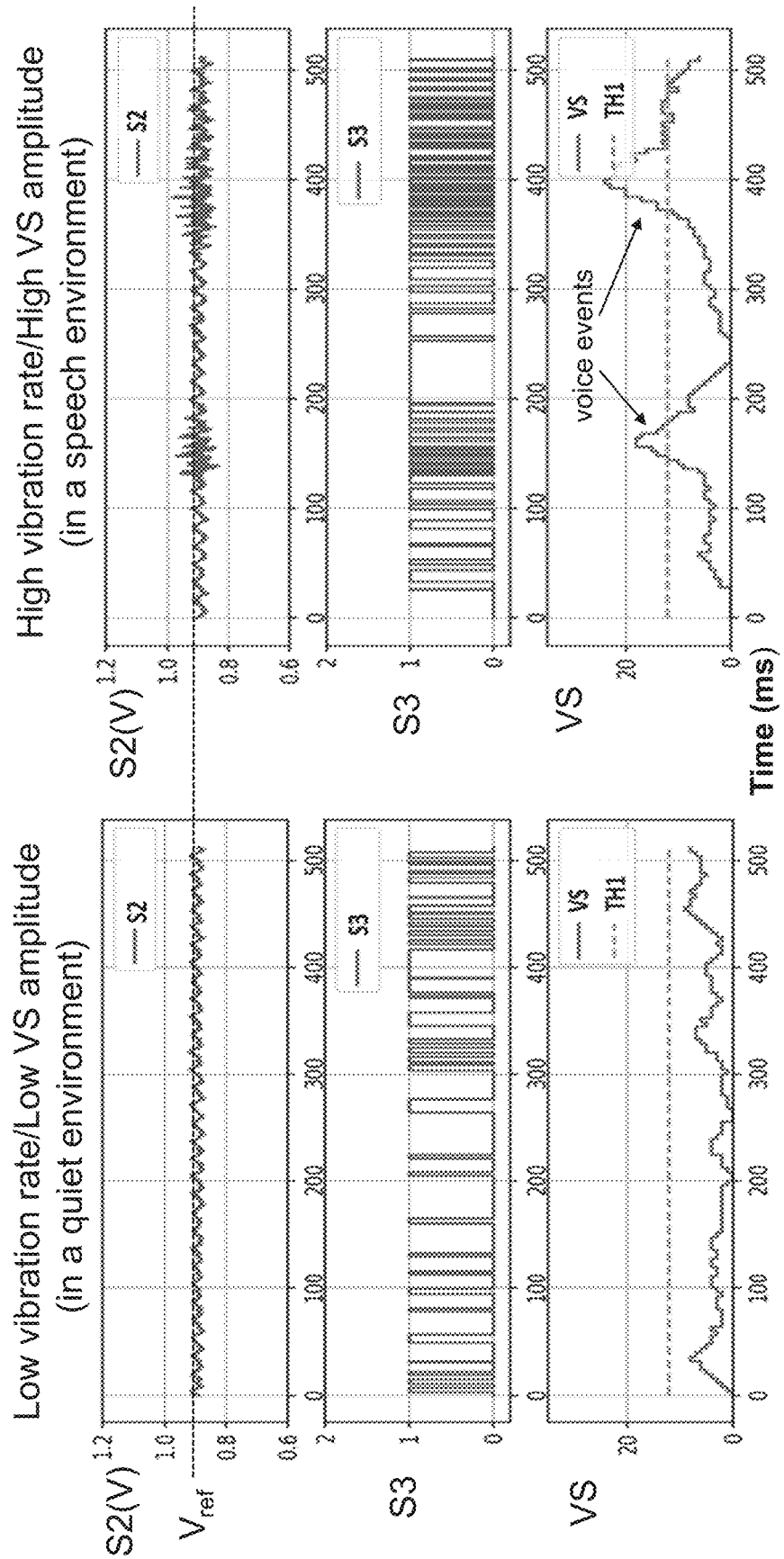

APPARATUS AND METHOD FOR VOICE EVENT DETECTION

CROSS-REFERENCE TO RELATED APPLICATION

This application claims priority under 35 USC 119(e) to U.S. provisional application No. 62/924,648, filed on Oct. 22, 2019, the content of which is incorporated herein by reference in its entirety.

BACKGROUND OF THE INVENTION

Field of the Invention

The invention relates to voice activity detection (VAD), and more particularly, to an apparatus and method for voice event detection applied in a computing system.

Description of the Related Art

VAD, also known as speech activity detection or speech detection, is a technique in which the presence or absence of human speech is detected. The detection result is generally used to trigger the following processes. VAD has been applied in speech-based applications and devices like smartphones, smart bands or smart speakers, which can be operated by using speech commands. The approaches can benefit a wide range of people, including physical disabilities.

As well known in the art, a classification rule in a typical VAD algorithm is applied to classify an audio signal as speech or non-speech by comparing the amplitude of the audio signal with a threshold. However, there is no way for VAD to distinguish human speech from other sounds. Thus, no matter what the audio signal is, a large enough volume/amplitude would definitely trigger downstream processes. Such a malfunction would result in wasting power consumption of a computing system.

What is needed is an apparatus and method for voice event detection capable of distinguishing a wake phoneme from input audio data stream for saving power consumption of a computing system.

SUMMARY OF THE INVENTION

In view of the above-mentioned problems, an object of the invention is to provide a voice event detection apparatus capable of correctly triggering a downstream module to save power consumption of a computing system.

One embodiment of the invention provides a voice event detection apparatus. The apparatus comprises a vibration to digital converter and a computing unit. The vibration to digital converter is configured to convert an input audio signal into vibration data. The computing unit is configured to perform a set of operations comprising: triggering a downstream module according to the sum of vibration counts of the vibration data for a number X of frames.

Another embodiment of the invention provides a voice event detection method. The method comprises: converting an input audio signal into vibration data; and, triggering a downstream module according to the sum of vibration counts of the vibration data for a number X of frames.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 2A and 2B respectively show different vibration rates and different amplitudes of sums VS of vibration counts in a quiet environment and in a speech environment.

DETAILED DESCRIPTION OF THE INVENTION

As used herein and in the claims, the term "and/or" includes any and all combinations of one or more of the associated listed items. The use of the terms "a" and "an" and "the" and similar referents in the context of describing the invention are to be construed to cover both the singular and the plural, unless otherwise indicated herein or clearly contradicted by context.

Figures 3A, 3B:
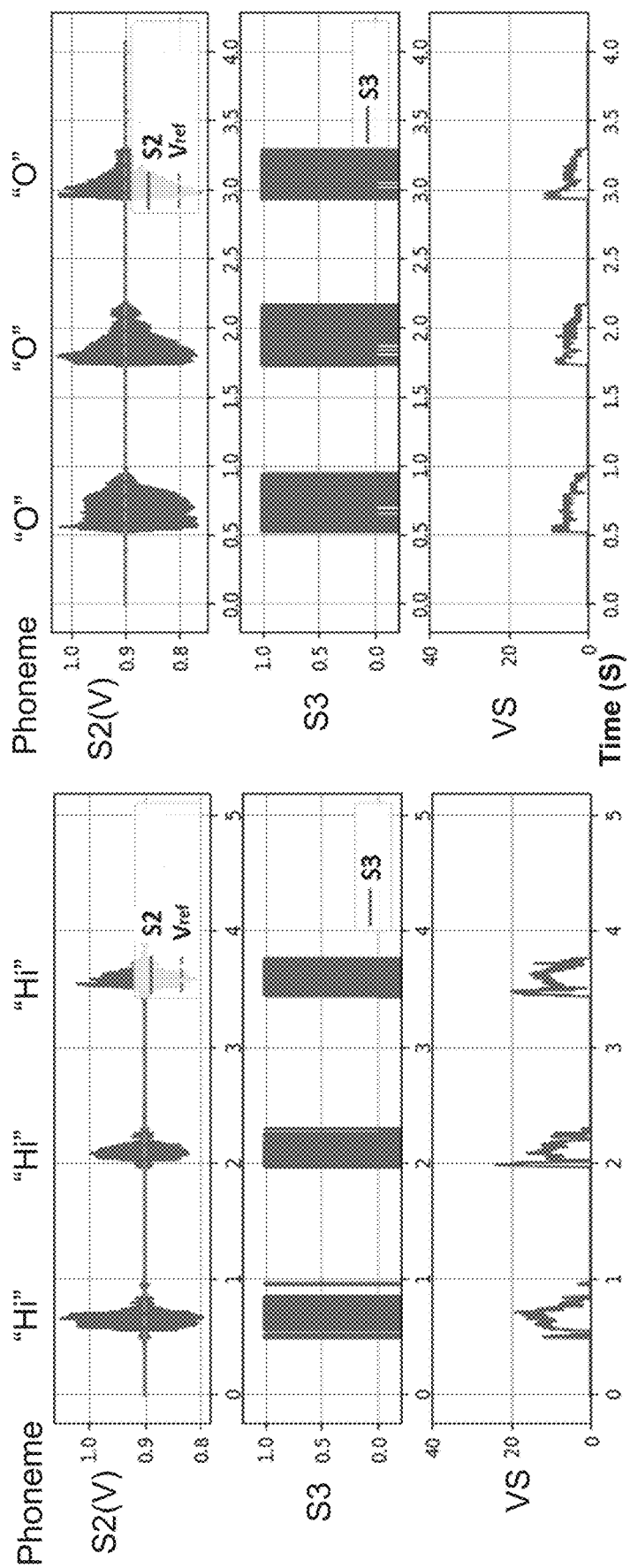
FIGS. 3A and 3B respectively show different vibration rates and different vibration patterns for phonemes "Hi" and "O".

In the specification and claims, the term "phoneme" refers to a unit of sound that distinguishes one word from another in a particular language; the term "vibration rate" refers to the number of to and fro movements between 0 and 1 for digitized vibration data S3 in each second; the term "vibration count (VC)" refers to the sum of values of the digitized vibration data S3 within each frame (will be described below). Besides, the term "vibration pattern" refers to data distribution of sums of vibration counts, each of which is calculated for every a predefined number of frames along time axis; for example, the bottom graphs in FIGS. 3A and 3B show two different vibration patterns or different data distribution of sums of vibration counts (i.e., VS values).

The vibration rate is similar to the vibration count. The more the vibration rate, the more the vibration count.

Amplitudes and vibration rates of audio signals are both observable. A feature of the invention is to detect voice events according to the amplitudes and the vibration rates of audio signals. Another feature of the invention is to distinguish speech from non-speech/silence by the sum of vibration counts of digitized vibration data S3 for a predefined number of frames. Another feature of the invention is to classify input vibration data stream S3 into different phonemes by their vibration patterns. Another feature of the invention is to correctly distinguish a wake phoneme from the input vibration data stream S3 so as to trigger downstream modules (e.g., software processes and/or hardware components), thereby to save the power consumption of a computing system.

Figure 1A:
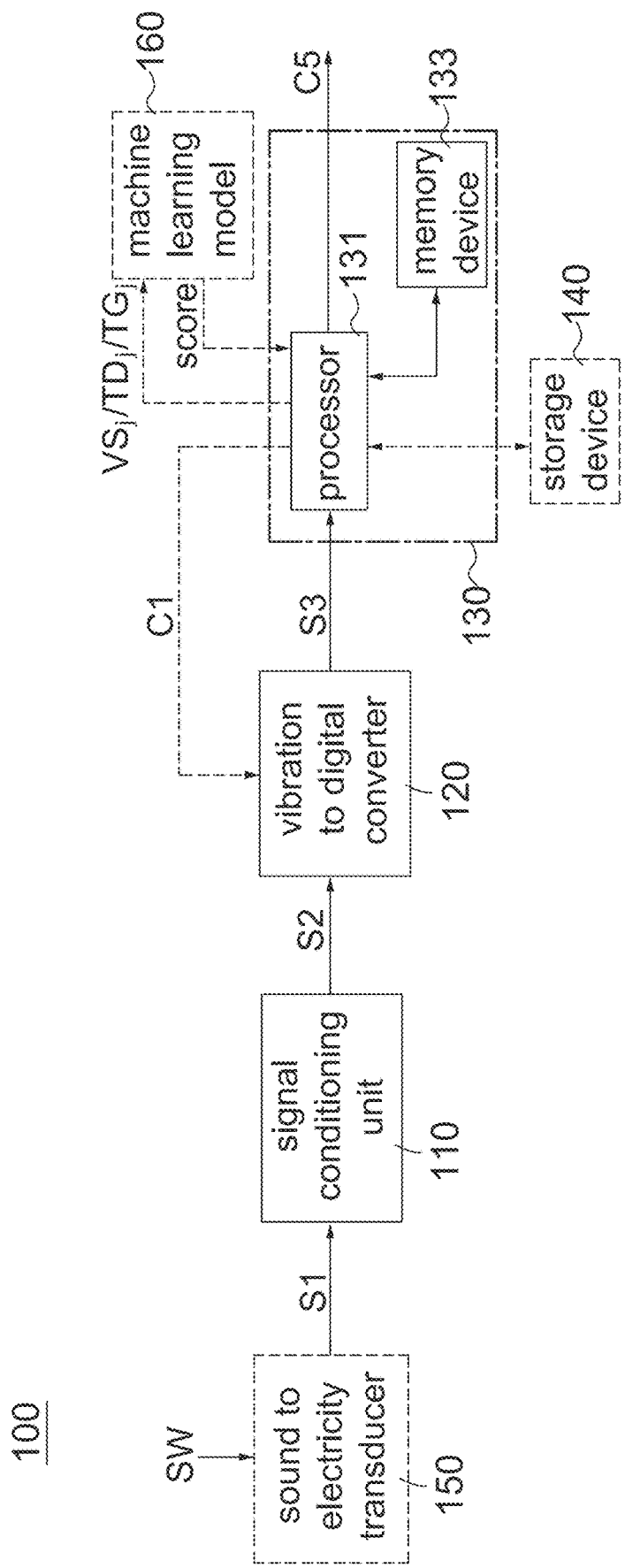
FIG. 1A is a schematic diagram of a voice event detection apparatus according to an embodiment of the invention.

FIG. 1A is a schematic diagram of a voice event detection apparatus according to an embodiment of the invention. Referring to FIG. 1A, a voice event detection apparatus 100 includes a signal conditioning unit 110, a vibration to digital converter (VDC) 120, a computing unit 130, a storage device 140, a sound to electricity transducer 150 and a machine learning model 160. Please note that the machine learning model 160 and the storage device 140 may be built inside the computing unit 130 or separate from the computing unit 130. Please also note that the storage device 140, the sound to electricity transducer 150, the machine learning model 160 and a control signal C1 are optional, and therefore are represented by dashed-lines in FIG. 1A. The voice event detection apparatus 100 can be applied within a number of computing systems, including, without limitation, general-purpose computing systems and speech processing systems. The speech processing systems include, without limitation, smartphones, smart bands and smart speakers. The storage device 140 may be implemented using non-volatile memory devices, media, volatile memory devices, disks or the like.

The sound to electricity transducer 150 can be implemented by any type of device capable of converting input sound waves SW into electrical signals S1 (voltage signals or current signals), such as a microphone, an electromagnetic transducer, an electrostatic transducer or a piezoelectric-crystal transducer. For purpose of clarity and ease of description, hereinafter, the following examples and embodiments will be described with the assumption that the electricity signals S1 are voltage signals.

Figure 1B:
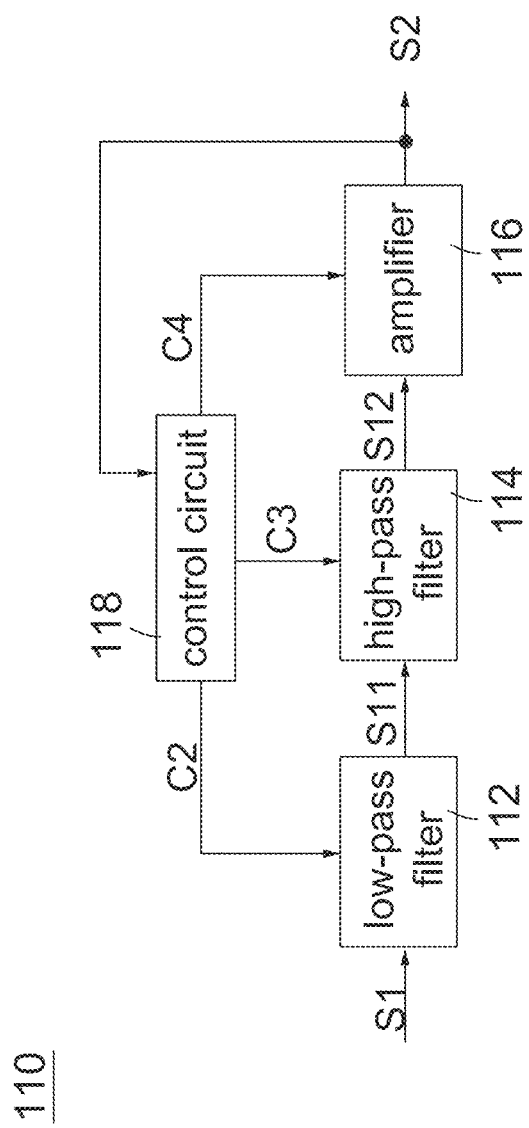
FIG. 1B is a schematic diagram of a signal conditioning unit according to an embodiment of the invention.

The signal conditioning unit 110 is used to manipulate the analog voltage signal S1 in a way that meets the requirements of the next stage (i.e., the VDC 120) of processing. The signal conditioning unit 110 performs high-pass filtering, low-pass filtering, amplification or a combination thereof on the analog voltage signal S1. The signal conditioning unit 110 may be implemented by software, hardware, firmware, or a combination thereof. FIG. 1B is a schematic diagram of the signal conditioning unit according to an embodiment of the invention. Referring to FIG. 1B, in one embodiment, the signal conditioning unit 110 includes a low-pass filter 112, a high-pass filter 114, an amplifier 116 and a control unit 118. The control unit 118 sends the control signals C2-C4 to the low-pass filter 112, the high-pass filter 114 and the amplifier 116 in response to the amplified signal S2. For example, the low-pass filter 112 adjusts its cutoff frequency $f_L$ according to the control signal C2; the high-pass filter 114 adjusts its cutoff frequency $f_H$ according to the control signal C3; the amplifier 116 adjusts its gain of the input signal S12 according to the control signal C4. Accordingly, the low-pass filter 112 receives the input voltage signal S1 and passes the signal S11 with a frequency lower than the cutoff frequency $f_L$; the high-pass filter receives the input signal S11 and passes the signal S12 with a frequency above its cutoff frequency $f_H$; the amplifier 116 amplifies the input signal S12 according to its gain and generates the amplified signal S2.

The VDC 120 is used to convert the analog amplified signal S2 into digitized vibration data S3 according to a reference voltage $V_{ref}$ and a tolerance voltage $V_T$. The VDC 120 may be implemented by software, hardware, firmware, or a combination thereof. In one embodiment, the VDC 120 uses the following program codes to convert the analog amplified signal S2 into the digitized vibration data S3 according to the reference voltage $V_{ref}$ and the tolerance voltage $V_T$:

If $(V_{S2}>(V_{ref}+V_T))$
   S3=1;
Else if $(V_{S2}<(V_{ref}-V_T))$
   S3=0;
Else
   S3=S3;

The tolerance voltage $V_T$, smaller than the reference voltage $V_{ref}$, is used to combine with the reference voltage $V_{ref}$ to form a first threshold voltage (i.e., $(V_{ref}+V_T)$) and a second threshold voltage (i.e., $(V_{ref}-V_T)$) so that the VDC 120 is capable of eliminating noise and interference on the analog amplified signal S2 based on the first and the second threshold voltages.

FIGS. 2A and 2B respectively show different vibration rates and different amplitudes of the sums VS of vibration counts (will be described below) in a quiet environment and in a speech environment. Assuming that $V_{ref}=0.92V$ and $V_T=0.005V$, we obtain a low vibration rate for vibration data S3 in the quiet environment and a high vibration rate for vibration data S3 in the speech environment. In the specification and claims, the term "frame size" refers to the number of sampling points corresponding to digitized vibration data S3 within each frame; the term "phoneme window Tw" refers to the time duration for collecting audio feature values for each phoneme. In a preferred embodiment, the time duration $T_F$ of each frame is about 0.1~1 milliseconds (ms) and the phoneme window Tw is about 0.3 seconds. In a further preferred embodiment, the number of sampling points corresponding to digitized vibration data S3 within each frame ranges from 1~16.

When audio signals are analyzed, a method of short-term analysis is usually adopted since most audio signals are stable within a short period of time. In the invention, the computing unit 130 receives an input vibration data stream S3 and then divides it into a plurality of frames. For example, assuming the sampling frequency fs used in the VDC 120 is 16000 and the time duration $T_F$ of each frame is 1 ms, the frame size would be fs*1/1000=16 samples points. Referring to FIG. 1A, the computing unit 130 is implemented by a processor 131 and a memory device 133. The memory device 133 stores instructions operable to be executed by the processor 133 to cause the processor 133 to perform all the steps of the methods in FIGS. 2C, 4A, 5 and 6A, divide the vibration data S3 into a plurality of frames and operate in a training phase and during runtime (will be described below).

Figure 2C:
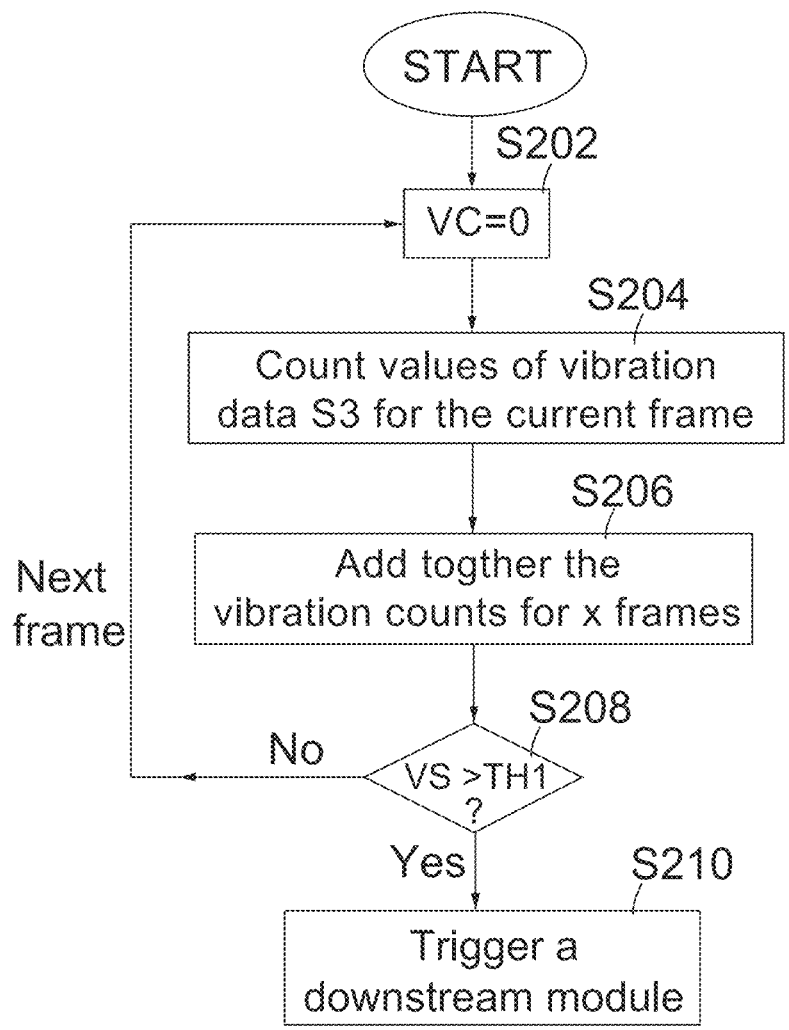
FIG. 2C is a flow chart showing a voice event detection method according to an embodiment of the invention.

The storage device 140 is configured to store a series of vibration counts VC, the sums VS of vibration counts, the sum $VS_f$ of vibration counts, the sum $VS_p$ of vibration counts (will be described below) and audio feature values of all feature vectors. FIG. 2C is a flow chart showing a voice event detection method according to an embodiment of the invention. The voice event detection method applied in a computing system is performed by the computing unit 130 during runtime to catch voice events. Hereinafter, the voice event detection is described with reference to FIGS. 2A-2D and with the assumption that fs=16000, $T_F$=1 ms, Tw=0.3 s, and TH1=8. A parameter j is initially set to 0.

Step S202: Reset a vibration count VC to 0.

Figure 2D:
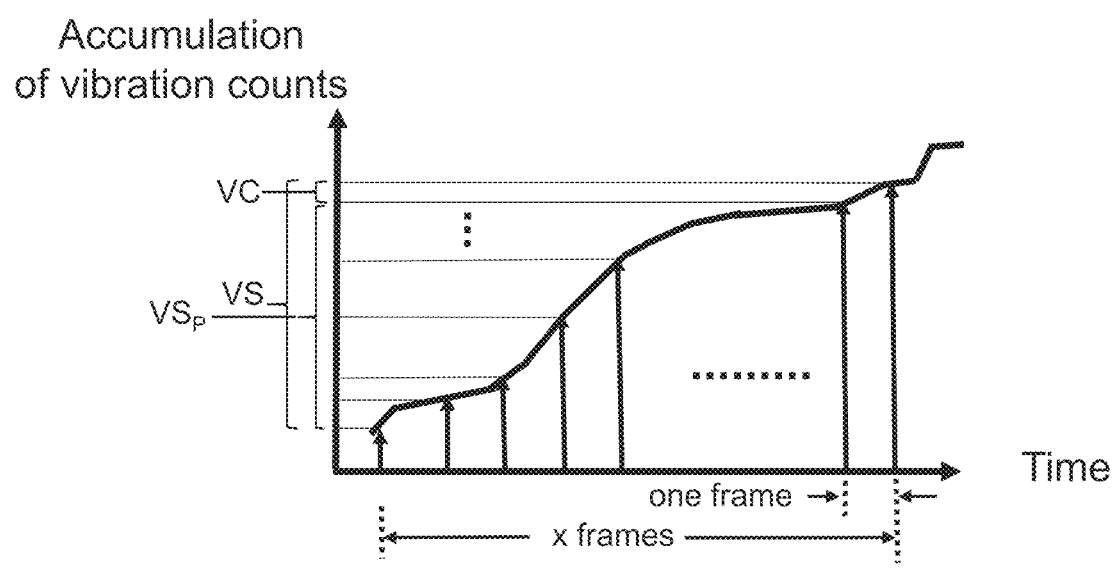
FIG. 2D is a graph showing a relationship among the vibration count (VC) for a current frame, the sum ($VS_p$) of vibration counts for its immediately previous (x-1) frames and the VS value for x frames in relation to time.

Step S204: Count the values of the digitized vibration data S3 for a current frame at time point $T_j$ to obtain a vibration count VC. Specifically, the computing unit 130 calculates the sum of values of vibration data S3 for the current frame (i.e., within 1 ms) to obtain a vibration count VC as shown in FIG. 2D and then stores the VC value for the current frame at time point $T_j$ in the storage device 140.

Step S206: Add together the vibration counts VC for x frames to obtain the sum VS of vibration counts for the current frame at time point $T_j$. Please note that the x frames include the current frame. In an embodiment, the computing unit 130 adds the vibration count VC of the current frame at time point $T_j$ and the sum $VS_P$ of vibration counts for its immediately previous (x-1) frames to obtain the sum VS(=VC+$VS_P$) of vibration counts for the x frames at time point $T_j$ as shown in FIG. 2D. In an alternative embodiment, the computing unit 130 adds the vibration count VC of the current frame at time point $T_j$, the sum $VS_f$ of vibration counts for its immediately following y frames and the sum $VS_P$ of vibration counts for its immediately previous (x-y-1) frames to obtain the sum VS(=VC+$VS_f$+$VS_P$) of vibration counts for the x frames at time point $T_j$, where y is greater than or equal to zero. The computing unit 130 stores the VS, $VS_f$ and $VS_P$ values in the storage device 140. In an preferred embodiment, the time duration (x* $T_F$) of the x frames (≅phoneme window Tw) is about 0.3 second. In a further preferred embodiment, the number of sampling points corresponding to digitized vibration data S3 for x frames ranges from x~16x. The j value is increased by 1.

Step S208: Determine whether the VS value is greater than a threshold value TH1. If YES, it indicates there is a voice event and the flow goes to step S210. If NO, it indicates there is no voice event and the flow returns to step S202 for the next frame. As shown in FIG. 2A, low vibration counts (i.e., low vibration rates) of vibration data S3 (middle graph) result in low amplitudes of VS values (bottom graph), so no voice event is detected in the quiet environment. By contrast, as shown in FIG. 2B, since high vibration counts (i.e., high vibration rates) of vibration data S3 (middle graph) result in higher amplitudes of VS values and multiple VS values reach the threshold value TH1 (bottom graph), multiple voice events are detected in the speech environment. Thus, the amplitudes of VS values can be used to distinguish speech from silence/non-speech.

Step S210: Trigger a downstream module. Once the voice event is detected, a downstream module is automatically triggered depending on the desired implementation. The module is at least one of a software process and a hardware component of a computing system (not shown). In one embodiment, the software process includes determining whether the input vibration data S3 matches a wake phoneme and then determining whether to trigger its next downstream module according to the matching result (e.g., FIG. 5A). In an alternative embodiment, the software process includes determining whether to increase the tolerance voltage $V_T$ according to the noise amount contained in the vibration data S3 (e.g., FIG. 6A). Without being triggered, its downstream software process or hardware component remains in a hibernate or power-off state, thus saving the power consumption of the computing system.

Figure 3C:
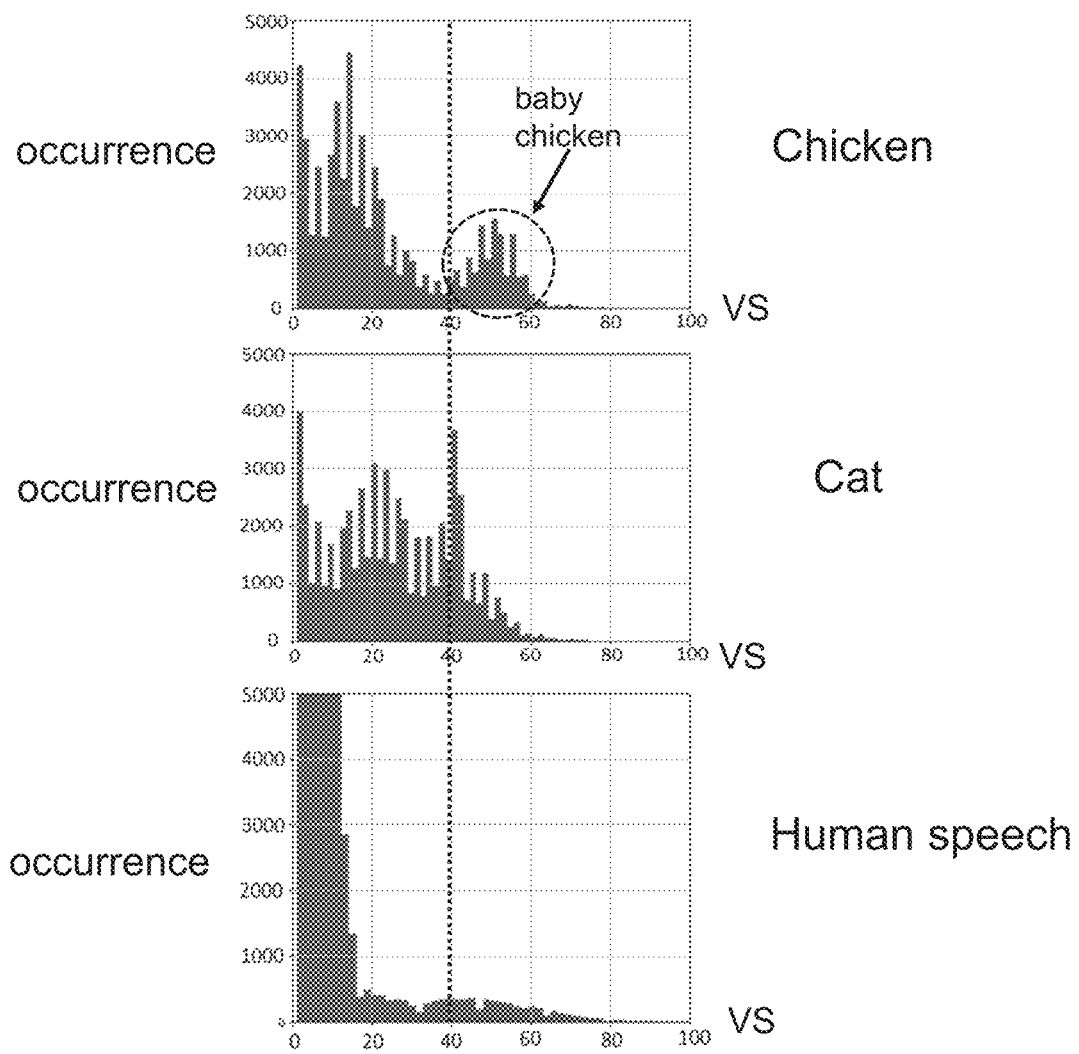
FIG. 3C show three different histograms for two-minute chicken sound, cat sound and human speech.

FIGS. 3A and 3B respectively show different vibration rates and different vibration patterns for phonemes "Hi" and "O". Each of FIGS. 3A and 3B provides three examples of the same phoneme. As can be observed in the bottom graphs, the same phonemes have the similar vibration patterns of VS values, but different phonemes have entirely different vibration patterns of VS values. Accordingly, the vibration patterns of VS values can be used to distinguish between different phonemes. FIG. 3C show three different histograms for two-minute chicken sound, cat sound and human speech. In FIG. 3C, the histograms shows three frequency distributions for up to 100 different VS values. As can be observed, unlike the chicken sound and the cat sound, most of the VS values for human speech are distributed below 40.

Figure 4A:
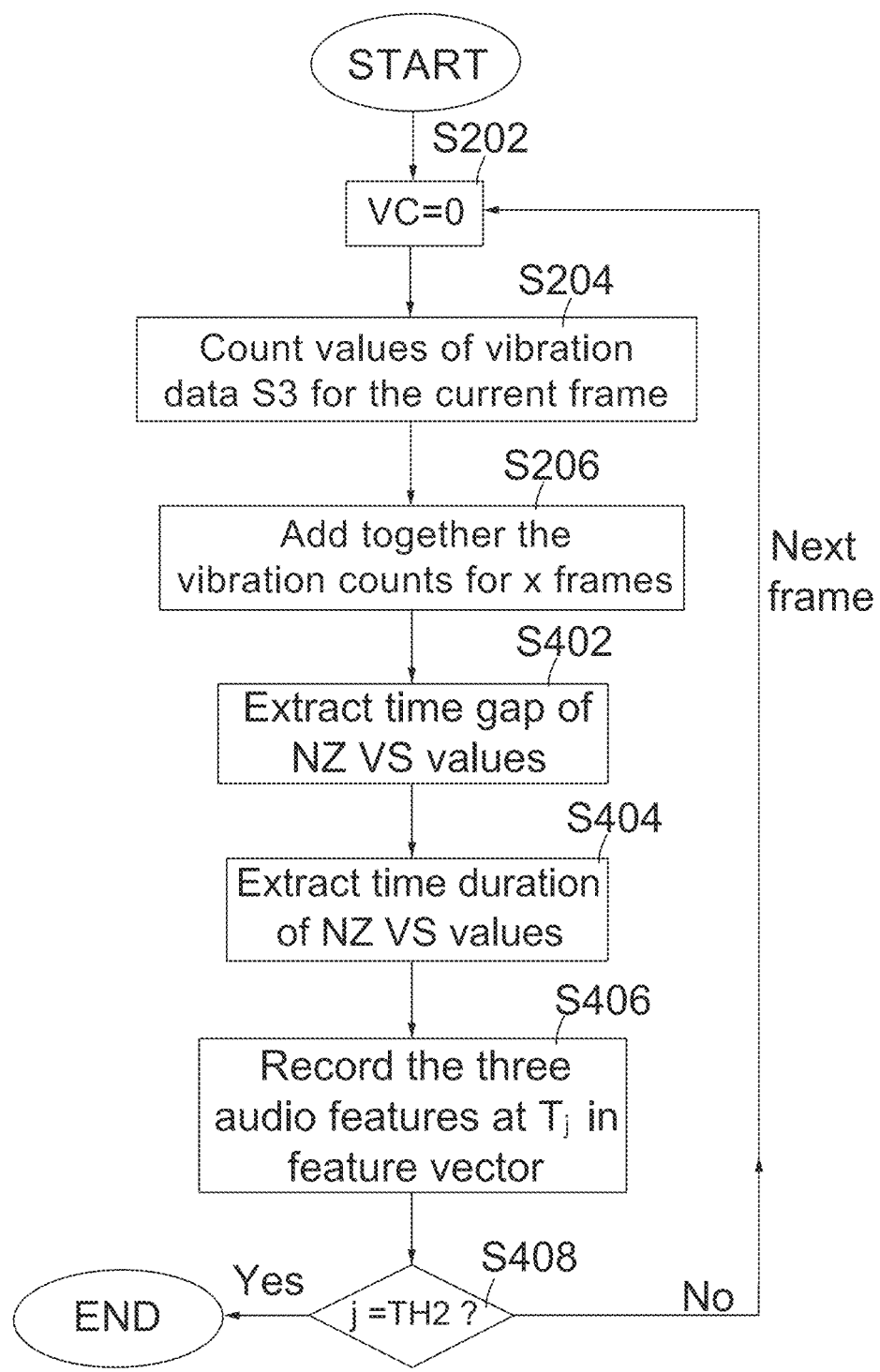
FIG. 4A is a flow chart showing a data collection method according to an embodiment of the invention.

In a training phase, the computing unit 130 first performs a data collection method in FIG. 4A multiple times to collect multiple feature vectors for multiple phonemes, and then adds the multiple feature vectors with corresponding labels to form multiple labeled training examples. Afterward, the multiple labeled training examples for different phonemes including a wake phoneme are applied to train the machine learning model 160. Finally, the trained machine learning model 160 (i.e., a predictive model) is created to classify whether the input vibration data stream S3 contains the wake phoneme. In a case that "Hi" is designated as the wake phoneme of a computing system, the machine learning model 160 is trained with multiple labeled training examples for different phonemes that at least include "Hi".

Figure 4B:
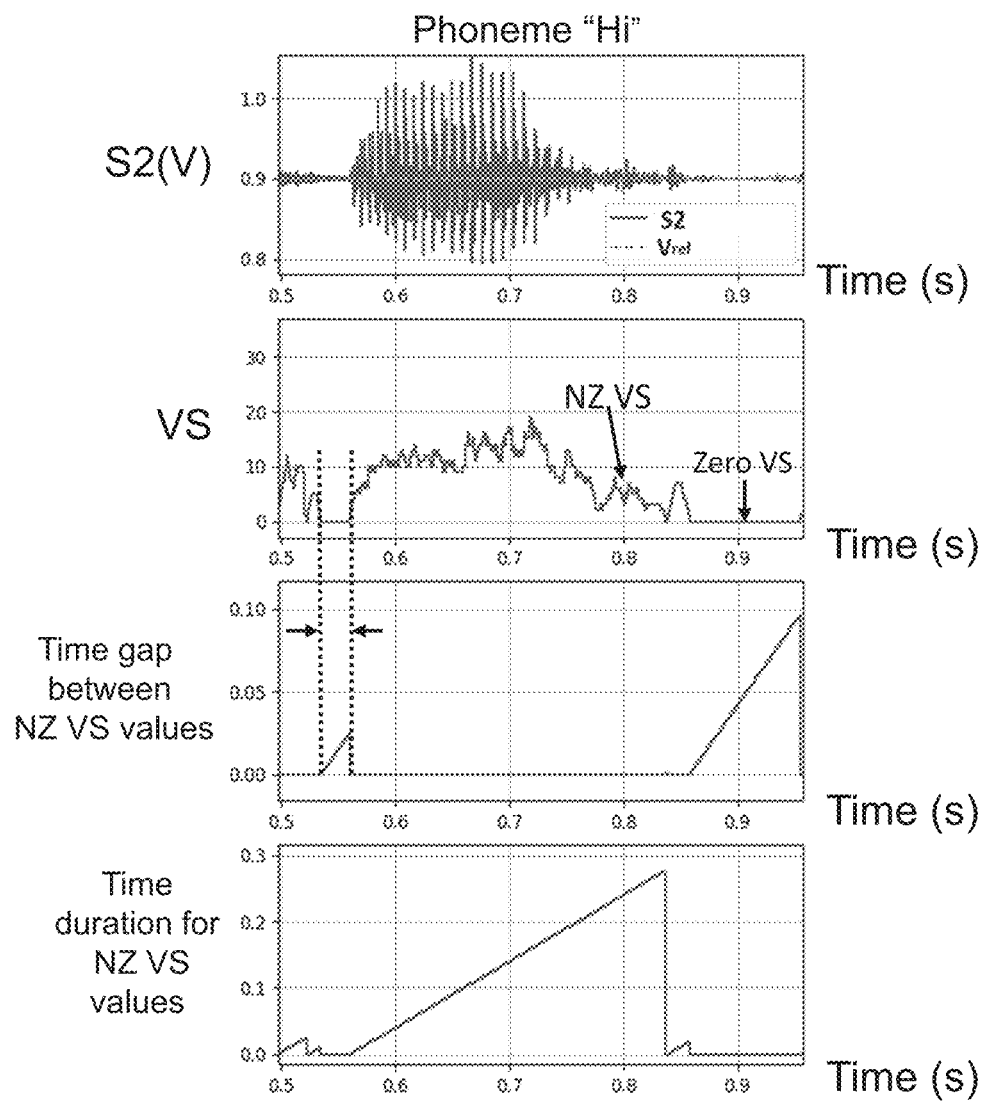
FIG. 4B shows a relationship among an analog amplified signal S2, the VS values, time gaps (TG) between non-zero (NZ) VS values and time durations (TD) of NZ VS values in relation to time for phoneme "Hi".

FIG. 4A is a flow chart showing a data collection method according to an embodiment of the invention. The computing unit 130 performs the data collection method in the training phase to obtain a feature vector of a single phoneme. For purposes of clarity and ease of description, the data collection method is described with reference to FIGS. 4A-4B and based on the same parameters with the same values (i.e., fs=16000, $T_F$=1 ms, Tw=0.3 s) as used in the voice event detection method in FIG. 2C. However, in actual implementations, the data collection method in FIG. 4A and the voice event detection method in FIG. 2C may operate in cooperation with the same parameters with different values, i.e., different sampling frequencies fs, different time durations $T_F$ of each frame, and different phoneme windows Tw. A parameter j is initially set to 0 and TH2 is set to 300. Please note that the first three steps (S202~S206) in the data collection method in FIG. 4A are the same as those in the voice event detection method in FIG. 2C and thus their descriptions are omitted herein.

Step S402: Extract a time gap (TG) between non-zero (NZ) VS values at time point $T_j$. Regarding the time duration (TD) for NZ VS values and the time gap (TG) between NZ VS values, please refer to the example for phoneme "Hi" in FIG. 4B. Please note that during the training phase, the time duration TD and the time gap TG keep being measured in milliseconds in the computing unit 130 at all time points. The computing unit 130 simply extracts the time gap TG at time point $T_j$.

Step S404: Extract a time duration (TD) of NZ VS values at time point $T_j$. The computing unit 130 also extracts the time duration TD at time point $T_j$. For example, at time point $T_j$=0.7 s in FIG. 4B, VS=18, TD=140 (ms) and TG=0.

Step S406: Record/store the above three audio feature values ($VS_j$, $TD_j$, $TG_j$) associated with the current frame at time point $T_j$ in a feature vector P. Specifically, the computing unit 130 stores the above three audio feature values ($VS_j$, $TD_j$, $TG_j$) for the current frame at time point $T_j$ of the feature vector P in the storage device 140. The j value is increased by 1.

Step S408: Determine whether j reaches a threshold value TH2. If YES, it indicates all the audio feature values for a single feature vector are already collected and the flow is terminated. If NO, the flow returns to step S202 for the next frame.

Although illustrated as discrete blocks, various blocks (S206, S402~S406) in FIG. 4A may be divided into additional blocks, combined into fewer blocks, or eliminated, depending on the desired implementation, and may be performed or otherwise carried out in an order different from that shown in FIG. 4.

Since Tw=0.3 s and $T_F$=1 ms, there are 300 frames (=TH2) associated with 300 different time points in the feature vector P, each frame having a group of three audio feature values ($VS_j$, $TD_j$, $TG_j$), for j=0~299. An example of feature vector P is listed as: ($VS_0$, $TD_0$, $TG_0$), ($VS_1$, $TD_1$, $TG_1$), . . . , ($VS_{299}$, $TD_{299}$, $TG_{299}$). The computing unit 130 performs the data collection method in FIG. 4A to obtain a single feature vector P of a single phoneme and stores each group of three audio feature values ($VS_j$, $TD_j$, $TG_j$) for the feature vector P, for j=0~299. Assuming the corresponding phoneme is "Hi", then the feature vector P is added with a label Q (labeled "Hi" by humans) to form a labeled training example, e.g., {P, Q}={($VS_0$, $TD_0$, $TG_0$), ($VS_1$, $TD_1$, $TG_1$), . . . , ($VS_{299}$, $TD_{299}$, $TG_{299}$), Q}. Likewise, the data collection method in FIG. 4A can be performed multiple times in the training phase to obtain multiple feature vectors P for different phonemes including "Hi"; besides, the multiple feature vectors P are respectively added with corresponding labels Q (each labeled either "Hi" or "not Hi") to form a set of labeled training examples. In the training phase, the set of labeled training examples are used to train the machine learning model 160, thereby to cause the machine learning model 160 to recognize the wake phoneme "Hi" based on the three audio feature values (i.e., ($VS_j$, $TD_j$, $TG_j$)) of each frame in each labeled training example, for j=0~299. At the end of the training phase, the trained machine learning model 160 provides a trained score corresponding to the wake phoneme "Hi" and the trained score is then used as a reference to classify the incoming vibration stream S3 during runtime.

Various machine learning techniques associated with supervised learning may be used to train the machine learning model 160. Example machine learning techniques include, without limitation, support vector machines (SVMs), random forest and convolutional neural network. In supervised learning, a function (i.e., the machine learning model 160) is created by using the multiple labeled training examples, each of which consists of an input feature vector and a labeled output. The supervision comes in the form of the labeled output, which in turn allows the machine learning model 160 to be adjusted based on the actual output it produces. When trained, the machine learning model 160 can be applied to new unlabeled examples to generate corresponding scores or prediction values.

In one embodiment, the machine learning model 160 is implemented using a neural network. The neural network includes one input layer, at least one hidden layer and one output layer. There are three input neurons in the input layer and each input neuron corresponds to a different one of the three audio feature values (i.e., $VS_j$, $TD_j$, $TG_j$) of each frame in the feature vector P. The hidden layer is comprised of neurons with weight factors related to each input and a bias factor of each neuron. By modifying the weight factors and the bias factor of each neuron in the hidden layer throughout the training cycle, the neural network can be trained to report a prediction value for a given type of input. The output layer includes one output neuron providing one score/prediction value corresponding to the wake phoneme "Hi". A plurality of machine learning tools including MATLAB, TensorFlow and Python can be used to build the neural network for the machine learning model 160.

Figure 5:
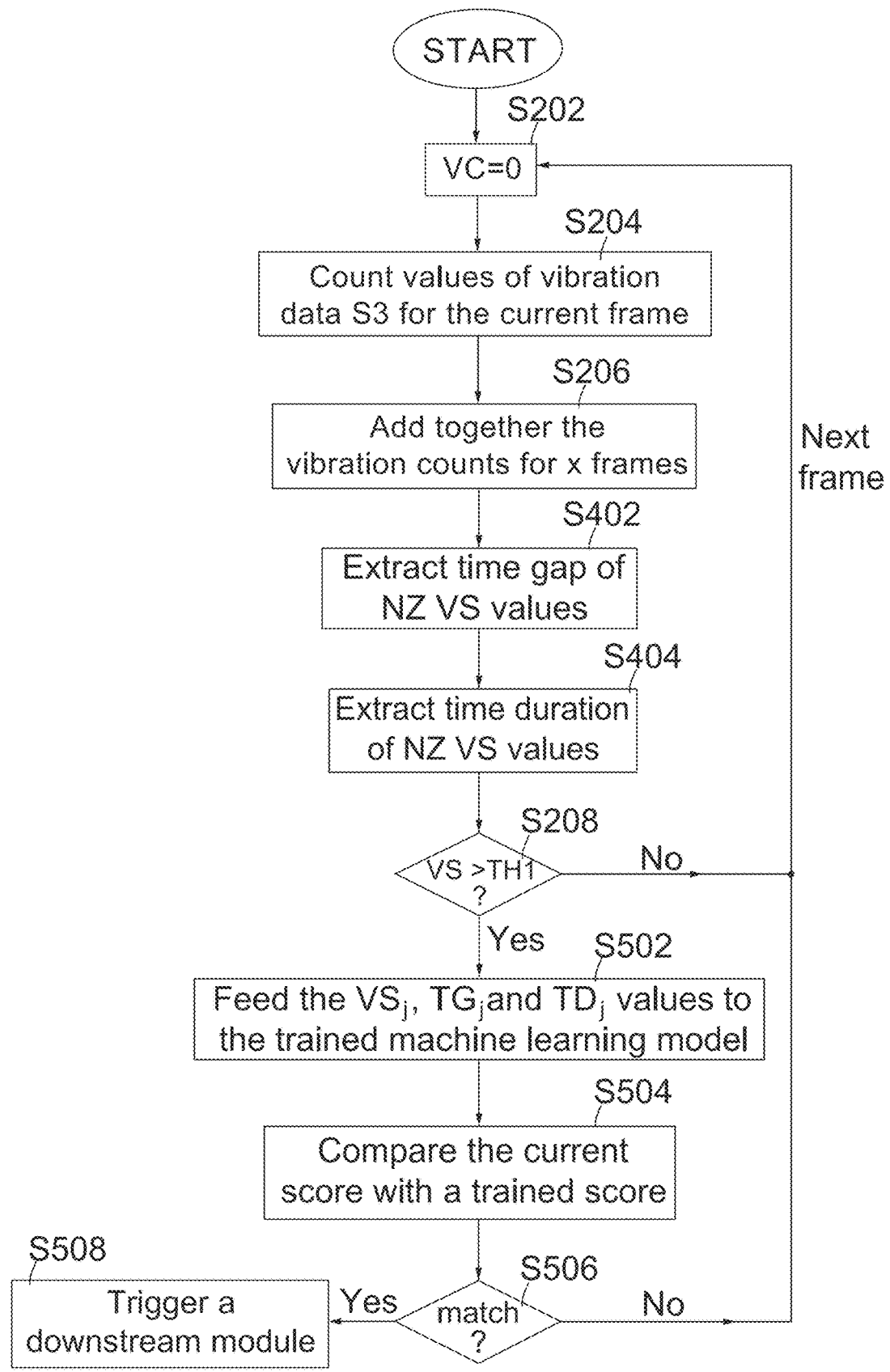
FIG. 5 is a flow chart showing a wake phoneme detection method during runtime according to an embodiment of the invention.

FIG. 5 is a flow chart showing a wake phoneme detection method according to an embodiment of the invention. The wake phoneme detection method is executed by the computing unit 130 during runtime for detecting whether an input vibration data stream S3 contains a wake phoneme "Hi". For purposes of clarity and ease of description, hereinafter, the wake phoneme detection method is described based on the same parameters with the same values as used in the data collection method in FIG. 4A (i.e., $f_S$=16000, $T_F$=1 ms, and Tw=0.3 s). However, in actual implementations, the data collection method in FIG. 4A and the wake phoneme detection method in FIG. 5 may operate in cooperation with the same parameters with different values, i.e., different sampling frequencies fs, different time durations $T_F$ of each frame, and different phoneme windows Tw. It is assumed that the machine learning model 160 has already been trained before the wake phoneme detection method is executed. A parameter j is initially set to 0. Since the first five steps (S202~S206 and S402~S404) in the wake phoneme detection method in FIG. 5 are the same as those in the data collection method in FIG. 4A, their descriptions are omitted herein.

Step S502: Feed the $VS_j$, $TD_j$, $TG_j$ values to the trained machine learning model 160 to generate a current score. Based on the VS, TD, TG values associated with its immediately previous 299 frames (previously fed to the trained machine learning model 160) and the $VS_j$, $TD_j$, $TG_j$ values of the current frame at time point $T_j$, the trained machine learning model 160 generates a current score for the current frame at time point $T_j$. Please note that at the early stage during runtime, some of the VS, TD, TG values associated with its immediately previous several frames may be empty/blank.

Step S504: Compare the current score with a trained score.

Step S506: Determine whether the input vibration data stream S3 matches the wake phoneme. Assuming that the trained machine learning model 160 provides the trained score ranging from 87 to 93 at the end of the training phase. For example, if the current score is 89, the computing unit 130 determines that the input vibration data stream S3 matches the wake phoneme "Hi" and the flow goes to step S508; if the current score is 95, the computing unit 130 determines that the input vibration data stream S3 does not match the wake phoneme "Hi" and the flow returns to step S202.

Step S508: Trigger a downstream module. The module may be at least one of a software process and a hardware component of a computing system. According to the comparing result, the computing unit 130 may issue a command to trigger a downstream software process and/or generate a control signal C5 to trigger a downstream hardware component of a computing system (not shown). Without being triggered, its downstream process or component remains in a hibernate or power-off state, thus saving the power consumption of the computing system.

Although illustrated as discrete blocks, various blocks (S206, S402~S404, S502~S404) in FIG. 5 may be divided into additional blocks, combined into fewer blocks, or eliminated, depending on the desired implementation, and may be performed or otherwise carried out in an order different from that shown in FIG. 5.

Figure 6A:
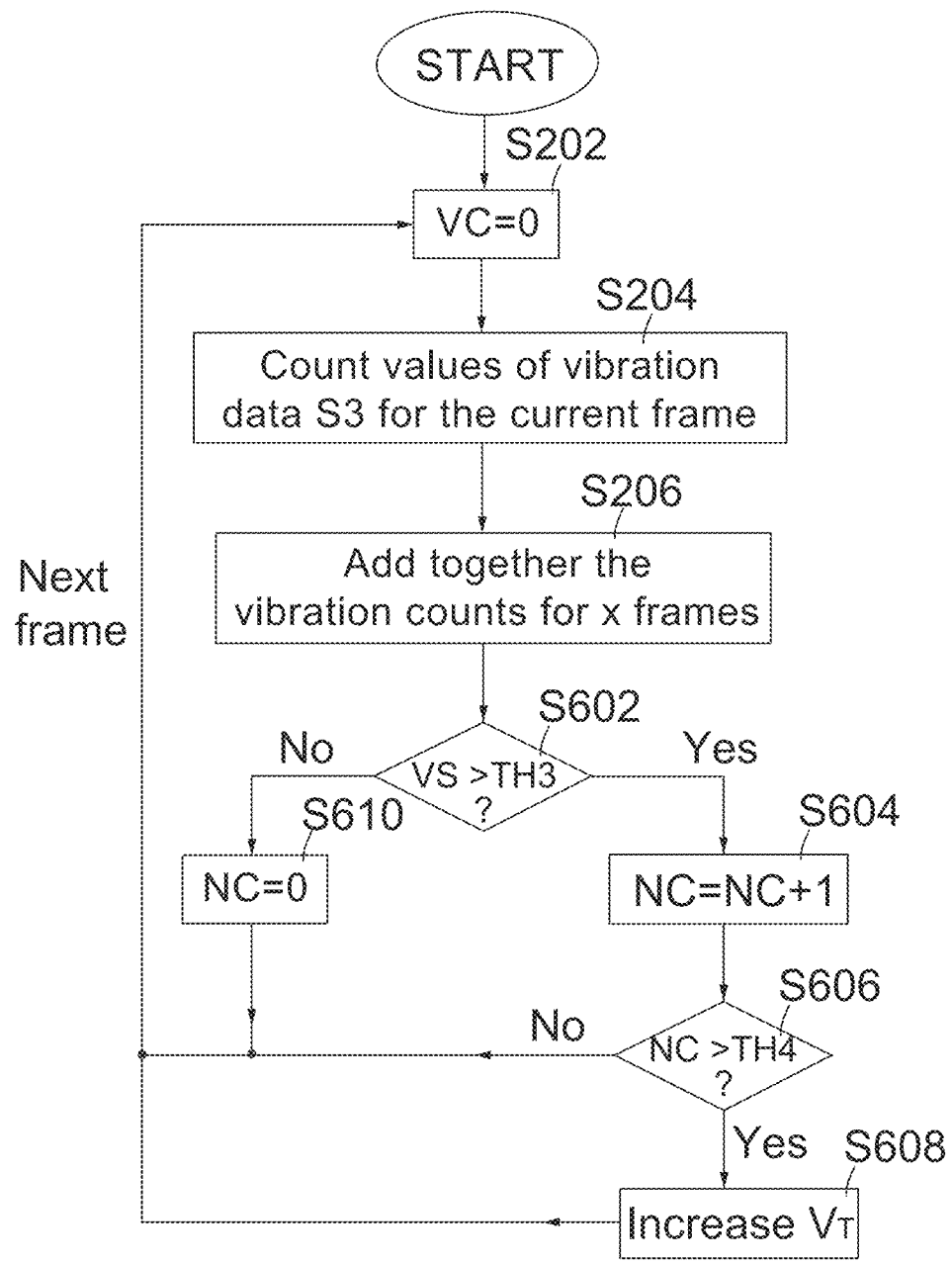
FIG. 6A is a flow chart showing a noise-filtering method according to an embodiment of the invention.

FIG. 6A is a flow chart showing a noise-filtering method according to an embodiment of the invention. The noise-filtering method is used to filter out the noise contained in the analog amplified signals S2/vibration data stream S3 to improve noise immunity. The noise-filtering method is performed by the computing unit 130. For purposes of clarity and ease of description, hereinafter, the noise-filtering method is described with reference to FIGS. 1A and 6A-6B and based on the same parameters with the same values (i.e., fs=16000 and $T_F$=1 ms) as those used in the voice event detection method in FIG. 2C. However, in actual implementations, the noise-filtering method may use different sampling frequencies fs and different time durations $T_F$ of each frame from those used in the voice event detection method in FIG. 2C. Please note that the first two steps (S202~S204) in the noise-filtering method in FIG. 6A are the same as those in the voice event detection method in FIG. 2C and thus their descriptions are omitted herein. Two parameters j and NC are initially set to 0.

Step S602: Determine whether the VS value is greater than a threshold value TH3. If YES, it indicates there is a noise event and the flow goes to step S604. If NO, it indicates there is no noise event and the flow goes to step S610. In one embodiment, the threshold value TH3 is equal to 5.

Step S604: Increase the noise count NC by 1.

Step S606: Determine whether the NC value is greater than a threshold value TH4. If YES, it indicates the input vibration data stream S3 contains a large amount of noise and the flow goes to step S608. If NO, it indicates the input vibration data stream S3 contains little noise and the flow returns to step S202. In a preferred embodiment, the computing unit 130 needs to keep monitoring the input vibration data stream S3 for around 10 seconds (i.e., a monitor period) to estimate the noise amount (i.e., the noise count NC) contained in the input vibration data stream S3. In one embodiment, since $T_F$=1 ms, the threshold value TH4 is equal to $10000(=10/10^{-3})$. The threshold value TH4 is associated with a time duration $T_F$ of each frame and the monitor period.

Figure 6B:
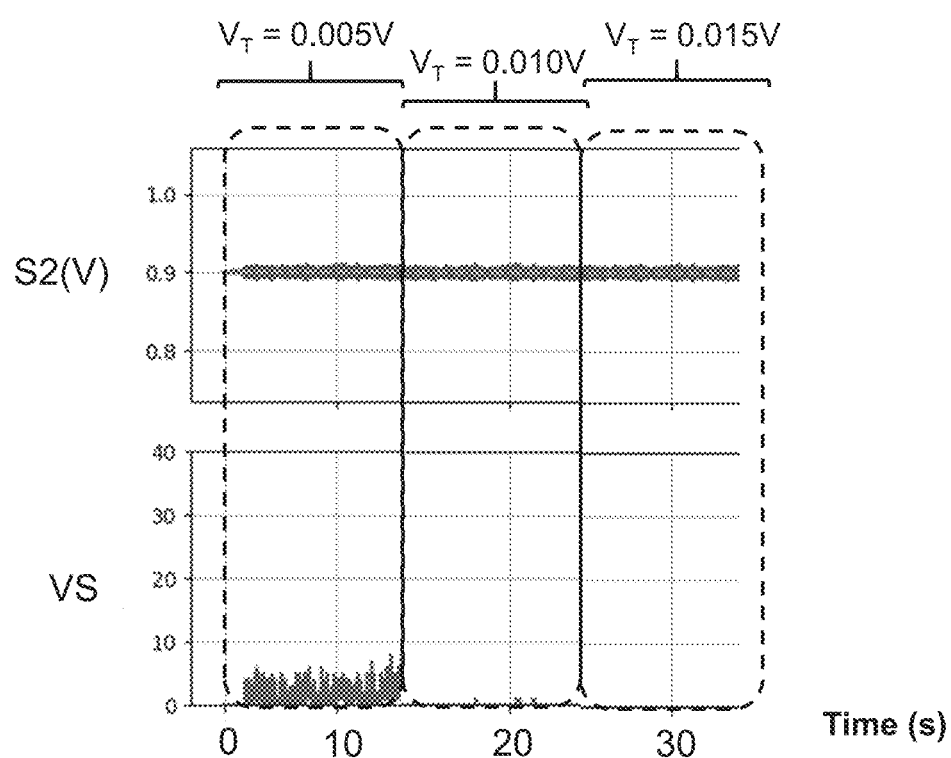
FIG. 6B shows a relationship among the S2 signal, a tolerance voltage $V_T$ and the VS values in relation to time.

Step S608: Increase the tolerance voltage $V_T$. In one embodiment, as shown in FIG. 1A, the computing unit 130 issues a control signal C1 to cause the VDC 120 to increase the tolerance voltage $V_T$. The more the tolerance voltage $V_T$, the less the noise amount contained in the vibration data stream S3, as shown in FIG. 6B. Then, the flow returns to step S202.

The voice event detection apparatus 100 according to the invention may be hardware, software, or a combination of hardware and software (or firmware). An example of a pure solution would be a field programmable gate array (FPGA) design or an application specific integrated circuit (ASIC) design. In an embodiment, the voice event detection apparatus 100 that excludes the sound to electricity transducer 150 is implemented with a general-purpose processor and a program memory. The program memory stores a processor-executable program. When the processor-executable program is executed by the general-purpose processor, the general-purpose processor is configured to function as: the signal conditioning unit 110, the vibration to digital converter 120, the computing unit 130 and the machine learning model 160.

The above embodiments and functional operations can be implemented in digital electronic circuitry, in tangibly-embodied computer software or firmware, in computer hardware, including the structures disclosed in this specification and their structural equivalents, or in combinations of one or more of them. The methods and logic flows described in FIGS. 2C, 4A, 5 and 6A can be performed by one or more programmable computers executing one or more computer programs to perform their functions. The methods and logic flows in FIGS. 2C, 4A, 5 and 6A can also be performed by special purpose logic circuitry, e.g., an FPGA (field programmable gate array) or an ASIC (application-specific integrated circuit). Computers suitable for the execution of the one or more computer programs include, by way of example, can be based on general or special purpose microprocessors or both, or any other kind of central processing unit. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

While certain exemplary embodiments have been described and shown in the accompanying drawings, it is to be understood that such embodiments are merely illustrative of and not restrictive on the broad invention, and that this invention should not be limited to the specific construction and arrangement shown and described, since various other modifications may occur to those ordinarily skilled in the art.

What is claimed is:

1. A voice event detection apparatus, comprising:
   a vibration to digital converter configured to compare an input audio signal with a first threshold voltage and a second threshold voltage to generate a vibration digit stream; and
   a computing unit configured to perform a set of operations comprising:
   triggering a downstream module according to a sum of multiple vibration digits in the vibration digit stream for a number X of frames, where X>1;
   wherein a difference between the first threshold voltage and the second threshold voltage is varied according to a noise amount of the multiple vibration digits; and
   wherein each vibration digit is one of two different digital values.

2. The apparatus according to claim 1, wherein the set of operations further comprises:
   dividing the vibration digit stream from the vibration to digital converter into a plurality of frames.

3. The apparatus according to claim 1, wherein the downstream module is at least one of a downstream software process and a downstream hardware component.

4. The apparatus according to claim 1, wherein the set of operations further comprises:
   counting values of the multiple vibration digits within a current frame to obtain a vibration count; and
   calculating the sum of the vibration counts for the number X of frames comprising the current frame.

5. The apparatus according to claim 4, wherein the operation of triggering further comprises:
   triggering the downstream module when the sum of the vibration counts is greater than a first threshold value.

6. The apparatus according to claim 5, wherein the operation of triggering the downstream module when the sum of the vibration counts is greater than the first threshold value further comprises:
   determining whether the input audio signal corresponds to a wake phoneme using a trained model when the sum of the vibration counts is greater than the first threshold value; and triggering the downstream module when the input audio signal corresponds to the wake phoneme.

7. The apparatus according to claim 6, wherein the trained model is one of a support vector machine, a random forest and a convolutional neural network.

8. The apparatus according to claim 6, wherein the operation of determining comprises processing a group of audio feature values for the current frame, y groups of audio feature values for its immediately following q frames and (X-y-1) groups of audio feature values for its immediately previous (X-y-1) frames using the trained model configured to classify the input audio signal as either corresponding to the wake phoneme or not corresponding to the wake phoneme, where y is greater than or equal to zero.

9. The apparatus according to claim 8, wherein each group of audio feature values comprises the sum of the vibration counts, a time gap between non-zero sums of the vibration counts and a time duration of non-zero sums of the vibration counts.

10. The apparatus according to claim 8, further comprising:
a storage device configured to store the vibration counts, the group of audio feature values for the current frame, the y groups of audio feature values for its immediately following y frames and the (X-y-1) groups of audio feature values for its immediately previous (X-y-1) frames;
wherein the storage device is either located outside the computing unit or embedded inside the computing unit.

11. The apparatus according to claim 6, wherein the set of operations further comprises:
training the trained model with a plurality of training examples, wherein each training example is associated with a feature vector and a single phoneme;
each feature vector comprises X groups of audio feature values for the number X of frames; and
each training example is labeled for either (a) the wake phoneme or (b) not the wake phoneme.

12. The apparatus according to claim 1, wherein the first threshold voltage is a sum of a reference voltage and a tolerance voltage, and the second threshold voltage is a difference between the reference voltage and the tolerance voltage.

13. The apparatus according to claim 12, wherein the operation of triggering further comprises:
counting values of the multiple vibration digits within a current frame to obtain a vibration count;
calculating the sum of the vibration counts for the number X of frames; and
increasing the tolerance voltage when the sum of the vibration counts is greater than a second threshold value and the noise amount of the multiple vibration digits is greater than a third threshold value;
wherein the third threshold value is associated with a time duration of each frame and a monitor period.

14. The apparatus according to claim 1, further comprising:
a sound to electricity transducer for converting input sound waves into an electrical signal and generating the electrical signal; and
a signal conditioning circuit coupled between the sound to electricity transducer and the vibration to digital converter for manipulating performing at least one of high-pass filtering, low-pass filtering and amplification on the electrical signal in compliance with the requirement of the vibration to digital converter to generate the input audio signal.

15. A voice event detection method, comprising:
comparing an input audio signal with a first threshold voltage and a second threshold voltage to generate a vibration digit stream; and
triggering a downstream module according to a sum of multiple vibration digits in the vibration digit stream for a number X of frames, where X>1;
wherein a difference between the first threshold voltage and the second threshold voltage is varied according to a noise amount of the multiple vibration digits: and
wherein each vibration digit is one of two different digital values.

16. The voice event detection method according to claim 15, further comprising:
dividing the vibration digit stream into a plurality of frames.

17. The voice event detection method according to claim 15, wherein the downstream module is at least one of a downstream software process and a downstream hardware component.

18. The voice event detection method according to claim 15, further comprising:
counting values of the multiple vibration digits within a current frame to obtain a vibration count; and
calculating the sum of the vibration counts for the number X of frames comprising the current frame.

19. The voice event detection method according to claim 18, wherein the step of triggering further comprises:
triggering the downstream module when the sum of the vibration counts is greater than a first threshold value.

20. The voice event detection method according to claim 19, wherein the step of triggering the downstream module, when the sum of the vibration counts is greater than the first threshold value comprises:
determining whether the input audio signal corresponds to a wake phoneme using a trained model when the sum of the vibration counts is greater than the first threshold value; and
triggering the downstream module when the input audio signal corresponds to the wake phoneme.

21. The voice event detection method according to claim 20, wherein the trained model is one of a support vector machine, a random forest and a convolutional neural network.

22. The voice event detection method according to claim 20, wherein the step of determining comprises:
processing a group of audio feature values for the current frame, q groups of audio feature values for its immediately following q frames and (X-y-1) groups of audio feature values for its immediately previous (X-y-1) frames using the trained model to classify the input audio signal as either corresponding to the wake phoneme or not corresponding to the wake phoneme, where y is greater than or equal to zero.

23. The voice event detection method according to claim 22, wherein each group of audio feature values comprises the sum of the vibration counts, a time gap between non-zero sums of the vibration counts and a time duration of non-zero sums of the vibration counts.

24. The voice event detection method according to claim 20, further comprising:
training the trained model with a plurality of training examples, wherein each training example is associated with a feature vector and a single phoneme;
each feature vector comprises a plurality of groups of audio feature values for the number X of frames; and each training example is labeled for either (a) the wake phoneme or (b) not the wake phoneme.

25. The voice event detection method according to claim 15, wherein the the first threshold voltage is a sum of a reference voltage and a tolerance voltage, and the second threshold voltage is a difference between the reference voltage and the tolerance voltage.

26. The voice event detection method according to claim 25, wherein the step of triggering further comprises:
counting values of the multiple vibration digits within a current frame to obtain a vibration count;
calculating the sum of the vibration counts for the number X of frames; and
increasing the tolerance voltage when the sum of the vibration counts is greater than a second threshold value and the noise amount of the multiple vibration digits is greater than a third threshold value;
wherein the third threshold value is associated with a time duration of each frame and a monitor period.

27. The voice event detection method according to claim 15, further comprising:
converting input sound waves into the input audio signal by a sound to electricity transducer.

* * * * *